Dec. 5, 1950
L. PETERSEN
2,532,781
TORSIONAL VIBRATION PICKUP
Filed April 21, 1944
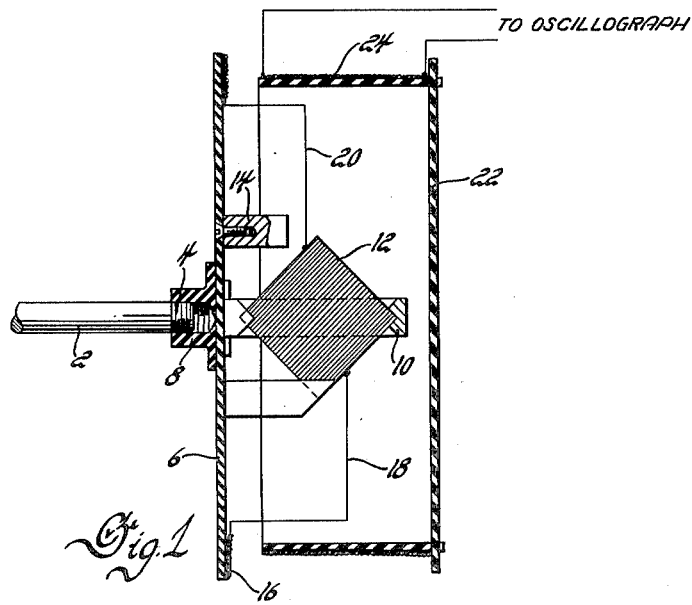
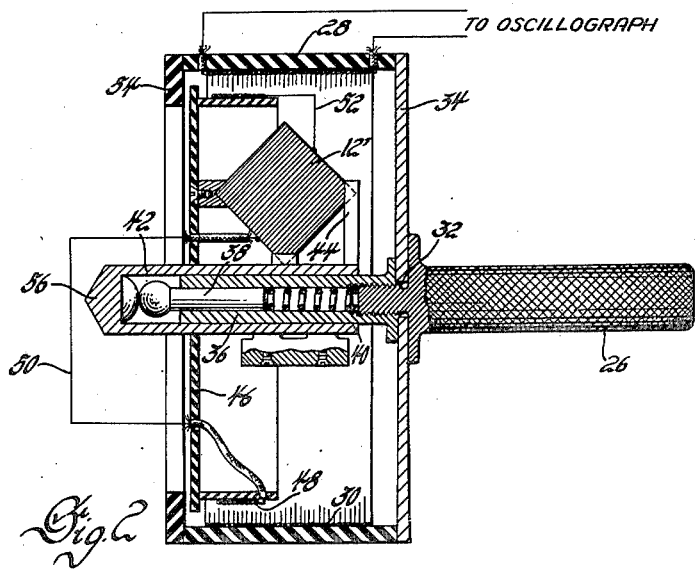
INVENTOR
Ludvig Petersen
BY
Blackmor, Smucer & Flint
ATTORNEYS Patented Dec. 5, 1950

2,532,781

UNITED STATES PATENT OFFICE 2,532,781

TORSIONAL VIBRATION PICKUP

Ludvig Petersen, La Grange, Ill., assignor to General Motors Corporation, Detroit, Mich., a corporation of Delaware Application April 21, 1944, Serial No. 532,184

3 Claims. (Cl. 73—68)

This invention relates to measuring and indicating means and more particularly to measuring and indicating means capable of measuring the torsional vibration of a rotating member.

In most mechanisms where rotating parts are used, it is the object of the designer or manufacturer to obtain as smooth a rotation of the part as possible. In electrical machines the problem is somewhat easier than in other machines due to the fact that the torque or force causing the rotation is relatively uniform. However, in many other devices, such as a steam engine or gas engine, the force applied to rotate the shaft or other rotating member occurs periodically at different portions of the cycle of rotation and therefore the actual peripheral speed of the device varies for different portions of its complete rotation. In order to ascertain a standard or find actual results of the application of power to a rotating member, it is desirable to have some means by which variations in this peripheral speed or torsional vibration may be measured.

It is therefore an object of my invention to provide means for measuring variations in the rotative speed of a body.

It is a further object of my invention to provide means for measuring variations in speed or torque of a rotating body which can be easily applied thereto.

It is a still further object of my invention to provide a torsional vibration meter for a rotating body which is relatively simple and portable.

It is a still further object of my invention to provide a torsional vibration meter consisting of a crystal whose stress is changed by the rotative force.

With these and other objects in view which will become apparent as the specification proceeds, the embodiments of my invention are best understood by reference to the following specification and claims and the illustrations in the accompanying drawings, in which:

Figure 1 is a section through a torsional vibration pick-up incorporating my invention.

Figure 2 is a sectional view through a modified form of pick-up also incorporating my invention.

Referring now more specifically to Figure 1, there is shown therein a shaft or other rotative part 2 having its projecting end threaded as shown at 4 for the application of means for measuring the torsional vibration thereof or other purpose. A large plate 6 of insulating material is rigidly secured to a threaded flange 8 which is in turn threaded on the shaft 2. This plate 6 acts as a support for a bracket 10 fixedly attached to the plate and which is adapted to hold in predetermined position a piezo-electric crystal 12 of the Rochelle salts type in such a manner that the inertia forces induced by changes in the speed will cause proportional bending stresses in the crystal. As exemplary of the size of crystal used those approximately 1¾" square by $\frac{3}{16}$" thick have been used but other sizes will operate as satisfactorily. The variation in stress on said crystal due to torsional vibration will, of course, affect the electrical characteristics thereof, producing different degrees of current, depending directly upon the stress. The crystal must be cut in such a plane as to give a maximum reading for the particular mounting used.

A balancing weight 14 is also carried by the rotating plate 6 to counterbalance the offset weight of a portion of the mounting 10. A coil 16 is carried adjacent the periphery of the plate 6 and is connected to the crystal by conductive lines 18 and 20. All of the equipment so far described is carried by or connected to the insulating plate 6 which is mounted upon the rotor shaft. Thus as the shaft rotates inertia forces will be applied to the crystal straining the same and thereby varying the electrical characteristics thereof. Since the coil 16 is connected in series therewith, current flowing therethrough will be altered to give a desired indication.

In order to pick up and measure this variation in the current flow in coil 16, a pick-up member is stationarily mounted in juxtaposition to coil 16. A large drum 22 carried by any suitable supporting means is adapted to be moved into the position shown in Figure 1 and the periphery of this drum carries a second coil 24 which is connected directly into the circuit of an oscillograph. Thus as the field of coil 16 varies, voltages are induced in coil 24 and impressed upon suitable indicating apparatus. Therefore by simply viewing the fluorescent screen of an oscilloscope, the variations in the voltages induced in coil 24 will be a direct indication of the variations in the speed or torsional vibration of the shaft due to a variation in the stress in the crystal caused by inertia force.

In Figure 2 is shown a modified form of my invention which is in this case designed along the lines of a tachometer which may be held against the depression usually found in the end of a shaft in the same manner as a tachometer to indicate variations in torsional vibration or speed. This device comprises a handle 26 which supports a cylindrical drum member 28, the circular portion of which is formed of insulating material and which carries on its inside surface a pick-up coil 30 which is, as in the former instance coil 24, connected directly to the control circuit of an oscilloscope. The handle 26 projects through an opening 32 in the center of a circular panel 34 which supports the drum 28 and is threaded into the end of a flanged tube 36 and clamps the plate 34 therebetween. A rod 38 is adapted to reciprocate within the central opening in the tube 36 and a compression spring 40 is mounted within this opening, tending to eject the rod 38 therefrom.

A larger sleeve 42 is mounted over the tube 36 and is adapted to carry on its inner end mounting means 44 for the crystal 12'. There is also mounted on the sleeve 42 an insulating plate 46 which assists in supporting the crystal 12' and also carries a coil winding 48 connected by conductive lines 50 and 52 to the crystal 12'. The mounting means 44 is rigidly secured to the sleeve 42 by set screws and member 46 is likewise fixedly secured thereto. The action of the spring 40 therefore in attempting to eject rod 38 will be to force the sleeve 42 and the support carried thereon to the left as shown in Figure 2 until the edge of member 46 engages the flange member 54 on member 28. When the operator places the peaked end 56 of the sleeve 42 against the rotating shaft, the spring 40 will be compressed and the sleeve 42 rotated at shaft speed on tube 36 as a bearing which as in the former instance applies centrifugal forces to the crystal, changing its characteristics sufficiently to cause current changes in the coil 48, which, as before, are picked up by coil 30 and applied to an indicating means such as an oscilloscope.

I have, therefore, provided a simple means for measuring torsional vibration or variation in speed of a shaft, one form of which can be threaded onto and supported by the rotating shaft in combination with a stationary part and the other of which may be applied to a rotating body in the same manner as a tachometer.

I claim:
1. A device for measuring the torsional vibration of a rotating shaft including, a casing, a rotatable member mounted in said casing with freedom of rotary motion and adapted to be held in mechanical contact and rotate with said shaft, said casing adapted to be held in the operator's hand, a square piezo-electric crystal secured at three corners to said rotatable member with the fourth corner free to flex under inertia forces caused by angular acceleration and deceleration of said shaft and produce an electrical potential, a transformer for said electrical potential including a primary coil mounted on and rotating with said rotatable member and electrically connected to said crystal and a secondary coil rigidly mounted on said casing and an electrical meter, circuit means connecting said meter to said secondary coil to thereby cause said meter to indicate the torsional vibration characteristics of said shaft.

2. A portable means for measuring rotational vibration in a rotating body including a casing, a rotatable member supported therein with freedom of rotary movement, means for frictionally engaging said rotatable member with said rotating body to drive said member from said body, a piezo-electric crystal mounted on said member and subject to inertia force set up by angular acceleration and deceleration as the member rotates so that the inertia force causes distortion of the crystal directly, a coil on said member connected in series relation with said crystal so that angular acceleration and deceleration of said body will cause light variations in inertia force acting on the crystal to produce proportional changes in the flow through said coil, said case being stationary and surrounding said rotatable member and capable of being held by the operator with means to manually maintain frictional engagement between said rotatable member and said rotating body, said stationary case having rigidly attached therein a pick-up coil in inductive relation to the first named coil.

3. A device for measuring the rotational vibration of a rotating shaft including, a casing, a rotatable member mounted in said casing with freedom of rotary movement and means on the casing for holding the rotatable member in mechanical contact with and rotate with said shaft, a four cornered piezo-electric crystal secured at three corners to said rotatable member with a fourth corner free to flex under inertia force caused by angular acceleration and deceleration of said shaft to thereby produce an electrical signal an electric meter capable of measuring electrical output of said crystal and means on the casing and rotatable member respectively for electrically connecting said meter to said crystal to measure the electrical signal produced by said crystal and thereby indicate the torsional vibration of said shaft.

LUDVIG PETERSEN.

REFERENCES CITED

The following references are of record in the file of this patent:

UNITED STATES PATENTS

| Number | Name | Date |
| --- | --- | --- |
| 1,599,922 | Rathbone | Sept. 14, 1926 |
| 2,161,256 | Karcher | June 6, 1939 |
| 2,193,910 | Wilson | Mar. 19, 1940 |
| 2,252,464 | Kearns | Aug. 12, 1941 |
| 2,288,838 | Pike et al. | July 7, 1942 |

FOREIGN PATENTS

| Number | Country | Date |
| --- | --- | --- |
| 423,706 | Great Britain | Feb. 6, 1935 |
| 470,454 | Germany | Jan. 15, 1929 |
| 508,657 | Great Britain | July 4, 1939 |
| 719,762 | France | Nov. 23, 1931 |